July 23, 1968 M. B. GRAY 3,394,315

AUTOMATIC GAIN CONTROL SYSTEM HAVING WIDE DYNAMIC RANGE

Filed Nov. 23, 1964

INVENTOR.
MARTIN BENNETT GRAY

BY Martin Kaelh [signature]

ATTORNEY

United States Patent Office 3,394,315
Patented July 23, 1968

3,394,315

AUTOMATIC GAIN CONTROL SYSTEM HAVING WIDE DYNAMIC RANGE

Martin Bennett Gray, Rochester, N.Y., assignor to General Dynamics Corporation, a corporation of Delaware
Filed Nov. 23, 1964, Ser. No. 413,178
9 Claims. (Cl. 325—404)

ABSTRACT OF THE DISCLOSURE

A non-linear automatic gain control system is described wherein gain control voltages are developed by envelope detecting a received signal. A pair of peak detector circuits control the charging of a pair of capacitors from a current source such that the capacitors become oppositely charged in accordance with the maximum and minimum values of the envelope. A non-linear resistance circuit is connected across both capacitors so as to permit them to charge at greater than a linear rate when the difference between the output voltages across the capacitors is increasing. This difference voltage is used as a gain control signal for a voltage controlled attenuator in order to control the gain of the received signal.

The present invention relates to communications apparatus, and particularly to a system and circuits for automatic gain control (AGC) of amplifiers and other communications apparatus.

The invention is especially suitable for use in receivers of the type which handle modulated signals which contain significant components having frequencies of the same order of magnitude as the rate or frequency of the undesired amplitude variations of the signals themselves. Communications apparatus which handle multiplexed signals, such as signals in which binary data is represented by low frequency modulation components in the low audio frequency range may use the invention advantageously. Exemplary of such apparatus is the system described in Franco et al., Patent No. 3,036,157, issued May 27, 1962.

Known AGC systems, as for example those which extract the varying direct current component of a detected incoming signal, generally have the frequency range of operation to follow the amplitude variations in the signal, but do not sufficiently attenuate all of the modulation components of the signal. The signal may therefore be distorted due to the AGC system, and errors may be introduced in data carried by the signal. Conversely known AGC systems which attenuate the low frequency components of the detected signal may not have sufficient frequency range of operation to follow and compensate for amplitude changes due to fading and other effects of signal transmission.

Accordingly, it is an object of the present invention to provide improved communications apparatus which handle signals subject to amplitude variations.

It is a further object of the present invention to provide an improved automatic gain control system and circuits which have sufficient frequency range of operation to follow signal amplitude variations without introducing signal distortion.

It is a still further object of the present invention to provide an improved automatic gain control circuit which minimizes signal distortion due to noise and other effects which rapidly change signal amplitude.

Briefly described, an automatic gain control system embodying the invention includes a circuit for providing the envelope of an incoming modulated signal which follows the low frequency components thereof. Circuits are provided for deriving an output AGC voltage which is a function of the difference between the maximum and minimum values of the envelope. This output voltage follows variations in amplitude of the overall signal, but not of the low frequency components thereof. The rate at which the AGC voltage can vary may be controlled so that rapid envelope amplitude changes as may be caused by noise are not followed. The AGC control voltage may operate a circuit for controlling the amplitude of the incoming signal.

The invention itself, both as to its organization and method of operation, as well as additional objects and advantages thereof will become more readily apparent from a reading of the following description in connection with the accompanying drawings in which.

Figure 1:
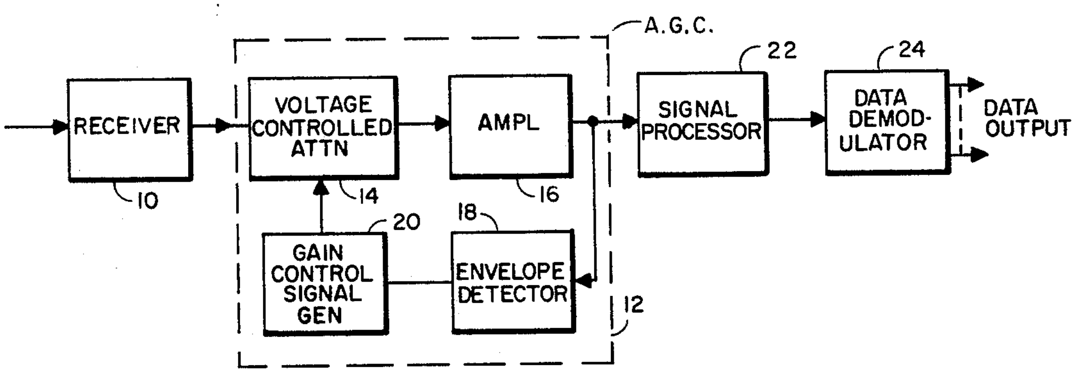
FIG. 1 is a simplified block diagram of data communications apparatus at a receiving terminal which apparatus includes an automatic gain control system embodying the invention.

Referring more particularly to FIG. 1, there is shown a data receiving terminal. Modulated data signals such as may be transmitted over a long range radio link are detected and demodulated by a receiver 10. The receiver may be a communications receiver of the type known in the art which derives an audio frequency signal containing the data signals. These data signals may represent data, such as binary bits, by means of frequency or phase shifts. In other words, the data signals may be FSK or PSK signals. Alternatively, the data signals may be amplitude modulated. The components of these signals which contain information may be in the low audio frequency range, say between ten c.p.s. and twenty-five c.p.s. Moreover, amplitude variations in the modulated signal, as may be caused by fading and interference effects therein in the course of transmission over the radio link may also be in the low audio frequency range. In order to accommodate these undesired amplitude variations in the signal and, at the same time, preserve the information content thereof, the signals are applied to an automatic gain control system (AGC) 12 including a signal channel having a voltage controlled attenuator 14 and an amplifier 16.

A control channel is connected between the output of the amplifier 16 and a control input of the attenuator 14. This channel includes an envelope detector 18 and a gain control signal generator 20 which provides an output for controlling the attenuation inserted into the signal channel by the voltage controlled attenuator 14. The output of the amplifier 16 is applied to a signal processor 22 which translates these signals into a form from which the data can be derived by means of a data demodulator 24 which provides the data output. The above referenced patent to Franco et al. illustrates signal processors and data demodulators which may be used to derive the data output from phase modulated signals.

Figure 2:
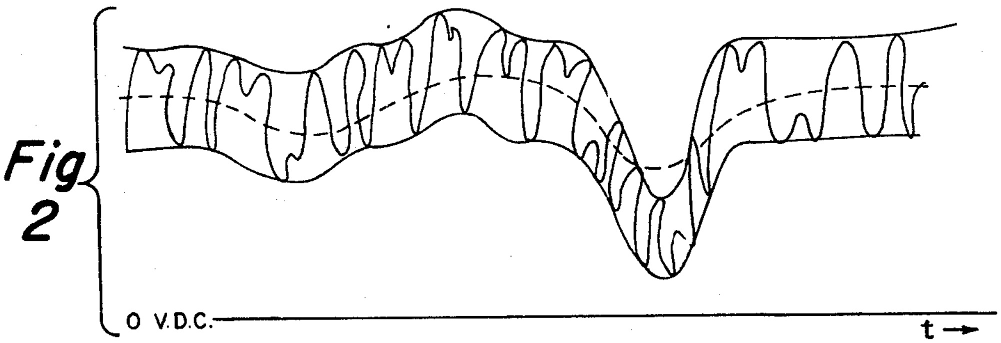
FIG. 2 is a waveform diagram which illustrates the response of the automatic gain control system illustrated in FIGS. 1 and 2.

The envelope detector 18 may include a full wave rectifier followed by a low pass filter which removes all but the lowest frequency signal components. The design of such detectors is known in the art and accordingly, will not be described in detail herein. The output of the envelope detector 18 is a direct current signal, such as shown in FIG. 2, which varies over an amplitude band in accordance with the envelope of the signal at the output of the amplifier 16. This envelope is shown by the solid line curve in FIG. 2. The undesired amplitude variations which are contained in this signal are represented by the peaks and the valleys of the envelope.

Figure 3:
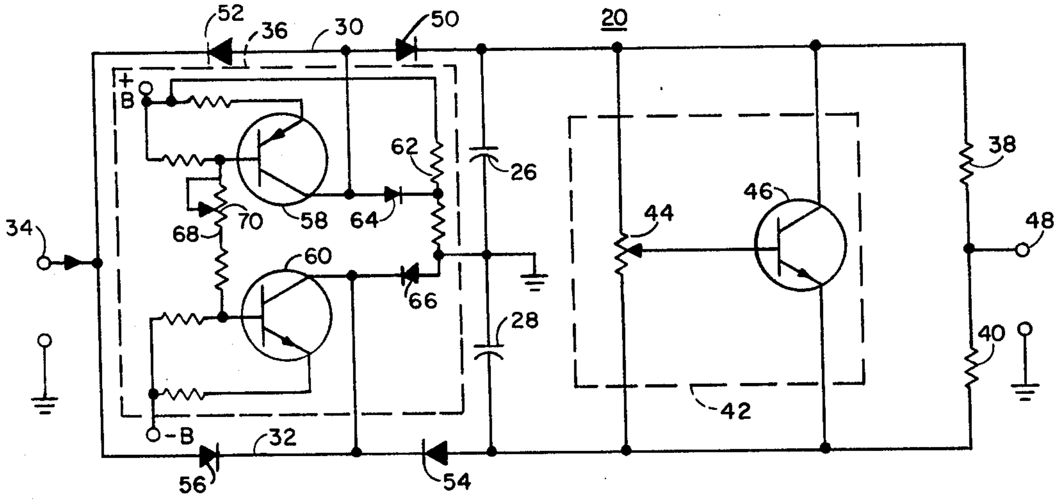
FIG. 3 is a schematic diagram of the circuit of the gain control signal generator of the system shown in FIG. 1.

The output of the envelope detector is applied to the gain control signal generator, the circuit of which is shown in FIG. 3. The generator 20 includes a pair of capacitors 26 and 28 which may have large values of capacitance of the order of a few hundred microfarads. Tantalum electrolytic capacitors may be suitable. These capacitors are connected to a point of reference potential, such as ground and to a pair of peak detector circuits 30 and 32. The peak detector 30 permits the capacitor 26 to be charged from a current source 36 to a voltage corresponding to the positive peak levels of the envelope signal at the input 34 of the generator 20. The peak detector 32, similarly permits the current source 36 to charge the capacitor 28 to a voltage equal to the negative peak of the envelope signal.

A pair of resistors 38 and 40 which may be of equal resistance value, are connected across the capacitors 26 and 28 and provide a discharge path therefor. A non-linear resistance circuit 42 is also connected across the capacitors 26 and 28 and permits the capacitors to discharge more rapidly when the voltage difference thereacross exceeds a certain voltage. This certain voltage may be adjusted by changing the position of the tap on the potentiometer 44.

The output voltage from the generator 20 may be taken between ground and an output terminal 48. This output terminal 48 is connected to the junction of the resistors 38 and 40. Accordingly, the output voltage will be a function of the difference between the voltages across the capacitors 26 and 28 and equal to the average of these voltages, when taken with respect to ground.

The peak detector 30 includes a pair of back-to-back diodes 50 and 52 and the peak detector 32 includes another pair of back-to-back diodes 54 and 56 which are polarized oppositely with respect to the diodes 50 and 52. The current source 36 includes a pair of transistors 58 and 60 which are emitter connected to oppositely polarized sources of operating voltage indicated at +B and −B respectively. These sources may be returned to ground. The collectors of the transistors 58 and 60 are respectively connected to the junction of the back-to-back diodes in the peak detectors 30 and 32.

The collector of the transistor 58 is limited so as not to exceed a certain positive voltage established by a divider 62 by means of a diode 64. The collector of the transistor 60 is clamped by means of a diode 66 so that it cannot assume a voltage lower than ground potential. These circuits protect the tantalum electrolytic capacitors 26 and 28, and limit the voltage range over which the output voltage which is generated may vary.

The transistors 58 and 60 are biased into their conductive states by being base connected to a voltage divider 68 which is connected between the sources at +B and −B. The amplitude of the current which may be supplied by the source 36 may be adjusted by means of a potentiometer 70 which is part of the divider 68. By adjusting the amplitude of this current the rate at which the capacitors 26 and 28 may be charged by the source 36 may be controlled. The rate of change in voltage output is thereby limited so that noise and other spurious effects do not generate undesirable output voltage variations.

The capacitors 26 and 28 are initially charged positively with respect to ground by current from the +B source which flows through the transistor 58 and diode 50 and through the resistors 38, 40, and 44. When an envelope signal is applied to the input terminal 34, the capacitor 26 charges to the peak value of the envelope so that the voltage across the capacitor 26 follows that peak value. Charging current flows through the diode 50 until the diode 52 becomes forwardly biased by virtue of its anode becoming as positive as the peak voltage of the envelope voltage of the envelope which is applied to its cathode.

The capacitor 28 is charged to the peak value of the negative going side of the envelope (albeit a positive voltage with respect to ground) since the diode 56 is biased in the forward direction and permits the capacitor 28 to discharge through the diode 54 until the voltage across the capacitor 28 decreases to the voltage of the negative going peak of the envelope. In other words, the diode 54 is forward biased by way of the diode 56 until the voltage across the capacitor 28 equals the voltage of the negative peaks of the envelope. The voltage across the capacitor 26 therefore follows the peaks of the envelope and the voltage across the capacitor 28 follows the valleys of the envelope.

The dashed line curves in FIG. 2 represents the output voltage which appears between the output terminal 48 and ground. This voltage is equal to one half the difference between the negative and positive peaks of the envelope. The voltage is constant until the amplitude of the envelope varies. For a slight negative going change or decrease in envelope amplitude, the voltage across the capacitor 26 stays approximately the same, since the capacitor 26 discharges somewhat through the resistors 38, 40 and 44. However, the voltage across the capacitor 28 decreases, resulting in a net decrease in the difference voltage across both capacitors 26 and 28. When the envelope amplitude increases to its former constant value, the output voltage gradually increases in accordance with the rate of charge of the capacitors 28.

Similarly, for an increase in envelope level the voltage across the capacitor 28 stays substantially the same while the voltage across the capacitor 26 increases. This results in a slight increase in the level of the output voltage. The output voltage of the generator 20 follows the variations in envelope level resulting primarily from amplitude variations affecting the higher frequency signal components. Neither the higher nor lower frequency signal components are themselves followed. Accordingly, the AGC system does not distort the signal or fail to accommodate undesirable amplitude variations in the signal.

As noted above the maximum rate at which the output signal can change in amplitude is controllable by adjusting the current source 36.

When a large change in envelope level occurs, illustrated in FIG. 2 by the dip in level towards the right hand side of the figure, the rate at which the capacitors 26 and 28 can discharge is increased by the non-linear resistance circuit 42. Accordingly, the output voltage follows dip in envelope level. In this manner it is possible to greatly attenuate the low frequency component of the envelope without sacrificing the ability to track large rapid changes in signal level.

The voltage controlled attenuator may be a transistor, the resistance of which is controlled by means of the output signal at the terminal 48. Alternatively, the voltage controlled attenuator may be a diode bridge, the resistance of the diodes being adjusted by the output voltage at the terminal 48.

From the foregoing description it will be apparent that there has been provided improved AGC system which is especially suitable for modulated signals having low frequency signal components. Other applications for the invention as well as variations and modifications in the described system and circuit, within the scope of the invention will undoubtedly suggest themselves to those skilled in the art. Accordingly, the foregoing description should be taken merely as illustrative and not in any limiting sense.

What is claimed is:

1. Communications apparatus comprising (a) a signal receiving channel, (b) means connected to said channel for providing an output which varies in accordance with variations in average level of the signals passing through said channel, (c) means responsive to said output for deriving a control signal which varies as a function of the difference between maximum magnitude portions of said output in opposite senses with respect to said average level thereof, and (d) means responsive to said control signal for controlling the amplitude of said channel signals.

2. Communications apparatus comprising (a) a signal receiving channel for passing modulated signals, (b) envelope detection means connected to said channel for deriving an output which varies in accordance with the envelope of said modulated signals, (c) means for generating a control signal which varies in accordance with the difference between the maximum magnitudes of said envelope in opposite senses, and (d) means included in said channel and responsive to said control signal for controlling the amplitude of said modulated signals in accordance therewith.

3. Communications apparatus comprising (a) a receiver for demodulating signals and providing output signals having information containing low audio frequency components, (b) signal amplitude control means responsive to a control voltage for translating said signals, (c) envelope detector means responsive to the signals provided at the output of said control means for deriving an output voltage which varies in accordance with the envelope of said signals, (d) control voltage generating means responsive to said output voltage including (i) means for providing a pair of voltages which respectively follow increases in the peak values of said output voltage in opposite senses, and (ii) means for providing an output voltage having an amplitude which varies in accordance with the difference between the amplitudes of said pair of voltages, and (e) means for applying said output voltage as said control voltage to said signal amplitude control means.

4. A system for generating an automatic gain control signal comprising (a) a source of voltage corresponding to the envelope of the signal to be controlled, (b) a pair of peak detector circuits coupled to said source for respectively providing output voltages which vary in accordance with the peak amplitudes of said source which change in an increasing sense and which change in a decreasing sense, and (c) an output circuit connected across the outputs of said peak detector circuit for deriving, as said gain control signal, a signal which is related to the difference between said peak detector circuit output voltages.

5. A system for generating an automatic gain control signal comprising (a) a source of voltage corresponding to the envelope of the signal to be controlled, (b) a pair of peak detector circuits coupled to said source for respectively providing output voltages which vary in accordance with the peak amplitudes of said source voltage which change in an increasing sense and which change in a decreasing sense, and (c) a non-linear resistance circuit connected across the output of said peak detector circuit for presenting a resistance which decreases at greater than a linear rate with increases in the difference between said peak detector circuit output voltages, and (d) an output circuit connected across the outputs of said peak detector circuit for deriving, as said gain control signal, a signal which is related to the difference between said peak detector circuit output voltages.

6. A system for generating an automatic gain control signal comprising (a) a source of voltage corresponding to the envelope of the signal to be controlled, (b) a pair of peak detector circuits coupled to said source for respectively providing output voltages which vary in accordance with the peak amplitudes of said source voltage which change in an increasing sense and which change in a decreasing sense, and (c) a current source connected to said peak detector circuit for providing constant operating current thereto, and (d) an output circuit connected across the outputs of said peak detector circuit for deriving, as said gain control signal, a signal which is related to the difference between said peak detector circuit output voltages.

7. A circuit for generating an automatic gain control voltage in response to a signal to be controlled comprising (a) a pair of voltage storage elements, (b) oppositely polarized diodes respectively connected to different ones of said elements for charging said elements to the peak value of said signal in one sense and to the peak value of said signal in the opposite sense, and (c) an impedance element connected across said elements for deriving said gain control voltage according to the difference between said peak value said in one sense and said peak value in said opposite sense.

8. A circuit for generating an automatic gain control voltage in response to a signal to be controlled comprising (a) a pair of capacitors, (b) a current source, (c) a pair of oppositely polarized diodes respectively connecting said current source to different ones of said pair of capacitors for charging said capacitors to voltages of opposite polarities, (d) another pair of oppositely polarized diodes connected respectively to different ones of said first named pair of diodes and responsive to the voltage of said signal to be controlled for biasing said first named pair of diodes in a direction to pass current from said source until said capacitors are charged to the peak levels of oppositely polarized portions of said signal to be controlled, and (e) a resistor connected across said capacitors for deriving said gain control voltage.

9. The invention as set forth in claim 8 including a voltage controlled active device including a control electrode and output electrodes which present a resistance which increases at greater than a rate which linearly follows the rate of increase of voltage applied to its control electrode, said output electrodes being connected across both of said pair of capacitors, a resistor also connected across said capacitors, and said control electrode being connected to an intermediate point along said resistor.

References Cited

UNITED STATES PATENTS 3,325,738 6/1967 Busby et al. ------ 325—478 XR

KATHLEEN H. CLAFFY, *Primary Examiner.*

R. LINN, *Assistant Examiner.*